July 13, 1948. J. J. CARMO 2,445,165
POULTRY FEEDER
Filed Oct. 18, 1945
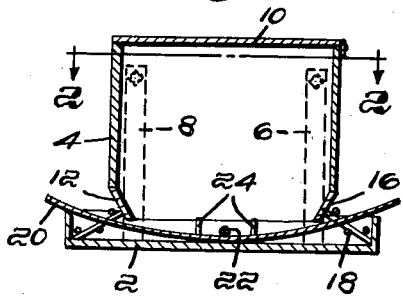
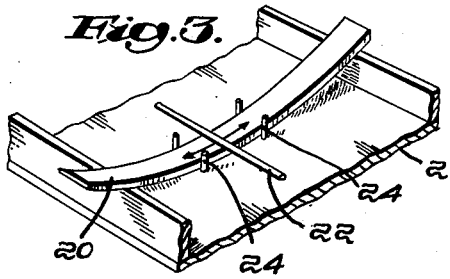
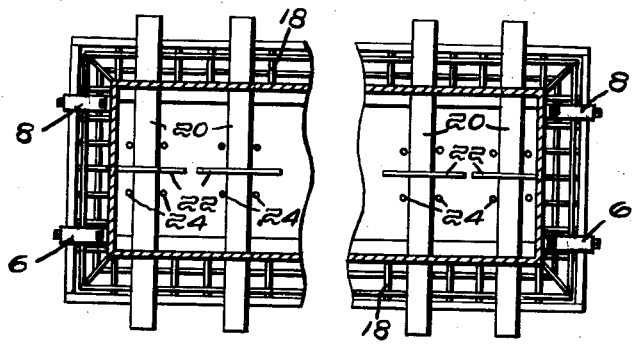
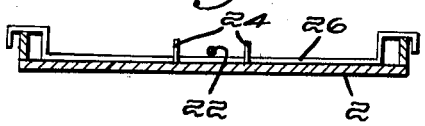
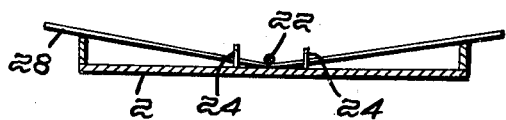
Inventor:
John J. Carmo,
by Chudley Chittick
Attorney Patented July 13, 1948

2,445,165

UNITED STATES PATENT OFFICE 2,445,165

POULTRY FEEDER

John J. Carmo, Arlington, Mass.

Application October 18, 1945, Serial No. 622,990

4 Claims. (Cl. 119—54)

This invention relates to poultry feeders.

The invention is particularly concerned with the provision of a poultry feeder and agitator so arranged that the birds themselves will cause movement of the agitator, thereby insuring a continuous replenishing supply of fresh feed from the hopper to the sides of the trough.

A further object of the invention is the provision of individual agitator units which may be supplied to poultry raisers to be incorporated in existing feeders. The invention further contemplates a construction which may be manufactured cheaply, but which, at the same time, will be rugged enough to stand continuous hard use.

These and other features of the invention will be more apparent as the description proceeds with the aid of the accompanying drawings, in which Fig. 1 is a vertical sectional view of a feeder incorporating the agitators.

Fig. 2 is a section on the line 2—2 of Fig. 1.

Fig. 3 is a broken-away perspective view, showing a single agitator unit in place in the trough of the feeder.

Fig. 4 a sectional elevation of the trough alone, with a modified type of agitator resting thereon.

Fig. 5 is similar to Fig. 4, but showing a modified type of agitator.

On referring to Figs. 1 and 2, the feeder consists of a trough 2 and a hopper 4 supported thereover by the end supporting struts 6 and 8. The hopper customarily has a cover 10 through which fresh feed may be introduced. The lower sides of the hopper slope inwardly as shown at 12 and 16 to concentrate the feed in the vicinity of the agitator, so that more effective movement will be had.

In the preferred form, a coarse screen or mesh 18 is positioned between the lower edges of the hopper and the corner of the trough. The purpose of this arrangement is to prevent birds from nosing the feed out of the trough and from attempting to walk therein. The mesh of the screen, however, is sufficiently large so that the birds will have no difficulty in eating the feed.

The construction heretofore described is conventional. The invention resides in the combination with this construction of a plurality of individual agitator units of novel form and action, so arranged that birds feeding at the trough will cause movement of the units and consequent motion of the feed under the hopper, thereby inducing a steady flow to the feeding area.

The construction of the agitator units is plainly shown in the several figures. A preferred form is shown in Figs. 1, 2 and 3 and consists of a slightly curved strip of material, preferably metal, indicated at 20, of such length that its ends extend beyond both sides of the trough. The curvature of the strip permits the center to rest on the bottom of the trough, while the sides rest lightly on the edges. Attached to the middle of the upper side of strip 20 and extending lengthwise of the trough is an agitator bar 22. The length of this bar will be such that the force a bird is able to exert against the end of strip 20 will be sufficient to cause bar 22 to move transversely through the feed.

Strip 20 is located in position on the trough bottom by means of suitable guides. One form of guide is shown in Figs. 1, 2 and 3, in which a series of four pins or posts 24 are spaced about the strip 20 to provide free longitudinal movement which is limited through the engagement of bar 22 with pins 24. The extent of the back and forth longitudinal movement of strip 20 is indicated by the arrow appearing thereon in Fig. 3. The spacing of pins 24 will be such that when strip 20 is at the limit of its travel in one direction, the inner end of strip 20 will not have passed beyond the side of the trough. In this way there is no danger of one end of the strip 20 getting caught in the trough so as to become inoperative.

The number of agitator units in a given feeder will, of course, differ with the length of the trough and hopper. It is desirable that the bars 22 be located reasonably close to each other so that no dead space will develop in the feed in the hopper.

The operation of the feeder is as follows.

The hopper is filled with feed which runs laterally to a limited height in the sides of the trough. Generally speaking, the feed will travel to the edges of the trough but will not extend upwardly beyond the protecting mesh 18. Thereafter, the birds will commence to eat the feed, and in so doing they will from time to time push against the ends of strips 20, thereby causing bars 22 to be oscillated back and forth in the feed. This movement of bars 22 causes sufficient disturbance in the feed so that an additional quantity will run laterally into the trough and replace that which the birds have eaten.

As previously pointed out, the frictional resistance to movement of the strip 20 and related bar 22 is within the scope of the force that would normally be exerted by a bird leaning thereagainst while feeding. Thus, the repeated intermittent movements of bars 22 result in a steady flow of fresh feed to replace that which has been eaten. Since birds prefer fresh feed to stale, this construction insures that all of the feed will be eaten. Waste is thereby prevented, thus reducing the cost of operation.

It will be observed that the agitator units may be manufactured apart from the trough and hopper and sold directly to poultry raisers who can then install them in existing feeders. On the other hand, it will be understood that the invention may be manufactured and sold as a complete unit, consisting of the trough, hopper, and agitator.

The agitator unit per se may be modified to some extent. Two alternative forms are shown in Figs. 4 and 5, in which the strip 26, instead of being curved, as strip 20 in Fig. 1, is flat and extends almost the entire distance across the bottom of the trough 2. The end portions of strip 26 are bent upwardly and over the sides of trough 2 in the hooklike formation disclosed. The agitator bar 22 is attached to the central portion of strip 26 and the strip is located and guided by pins 24 in the manner heretofore described.

The overall length of strip 26 is such that limited back and forth movement is permitted as the birds push alternately against the opposite ends. The result is that bar 22 will be moved in a manner similar to that described with relation to Figs. 1, 2 and 3.

Still another form is shown in Fig. 5, in which the strip 28 consists of two straight sections joining at the approximate center of the trough. The angle of the connecting sides is such that the center rests on the bottom and the ends lightly touch the sides of the trough. The agitator bar 22 is attached at the center in the usual manner and the strip 28 is located and its movement limited by pins 24 as heretofore described.

While preferred forms of the invention have been disclosed, it will be understood that I do not intend to be limited thereby, but only by the appended claims.

I claim:

1. In a poultry feeder, the combination of a trough, a hopper positioned over said trough, and an agitator for causing feed to flow from said hopper to the sides of said trough, said agitator comprising a strip of rigid material extending transversely of said trough and beyond the sides thereof, said strip having attached thereto close to its mid-point a bar extending longitudinally of the trough, said strip being so shaped that said bar will be located close to the bottom of said trough, and means connected to the bottom of said trough for guiding the transverse movement of said strip as it may be pushed back and forth by birds feeding from said trough.

2. In a poultry feeder, the combination of a trough, a hopper positioned over said trough, and an agitator for causing feed to flow from said hopper to the sides of said trough, said agitator comprising a strip of rigid material extending transversely of said trough and beyond the sides thereof, a bar attached to said strip at substantially the mid-point thereof and extending longitudinally of said trough, said strip being bent downwardly at its center to rest on the bottom of said trough while the ends of said strip pass over the top of the sides of said trough, and means connected to the bottom of said trough for guiding the transverse movement of said strip as said strip may be pushed back and forth by birds feeding in said trough.

3. In a poultry feeder, the combination of a trough, a hopper positioned over said trough, and an agitator for causing feed to flow from said hopper to the sides of said trough, said agitator comprising a strip extending transversely of said trough and beyond the sides thereof, a bar attached to said strip at substantially the mid-point thereof and extending longitudinally of said trough and close to the bottom thereof, said strip being shaped so that the center portion of the strip is in slidable engagement with the bottom of the trough and the ends of said strip pass over the sides of said trough, and guide-posts connected to the bottom of said trough and located on both sides of said strip and on both sides of said bar, whereby the transverse movement of said strip will be guided as it is pushed back and forth by birds as they may feed at said trough.

4. In a poultry feeder the combination of a trough, a hopper positioned over said trough, and an agitator for causing feed to flow from said hopper to the sides of said trough, said agitator comprising a strip of rigid material extending transversely of said trough and beyond the sides thereof, said strip having attached thereto close to its midpoint a bar extending substantially at right angles to said strip, said strip being so shaped that said bar will be located close to the bottom of said trough, and means fixed with respect to said trough for guiding the transverse movement of said strip as it may be pushed back and forth by birds feeding from said trough.

JOHN J. CARMO.

REFERENCES CITED

The following references are of record in the file of this patent:

UNITED STATES PATENTS

| Number | Name | Date |
| --- | --- | --- |
| 122,902 | Mathers | Jan. 23, 1872 |
| 140,067 | Munson | June 17, 1873 |